United States Patent
Sishtla et al.

(10) Patent No.: US 6,237,353 B1
(45) Date of Patent: May 29, 2001

(54) SYSTEM FOR REMOVING PARASITIC LOSSES IN A REFRIGERATION UNIT

(75) Inventors: Vishnu M. Sishtla, Cicero; Michael A. Stark, Syracuse, both of NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/363,609

(22) Filed: Jul. 29, 1999

(51) Int. Cl.$^7$ .................................................... F25D 23/12
(52) U.S. Cl. ................................. 62/259.2; 62/238.6
(58) Field of Search .................................. 62/259.2, 238.6

(56) References Cited

U.S. PATENT DOCUMENTS

| | | | |
|---|---|---|---|
| 5,669,813 | * 9/1997 | Jairazbhoy et al. | 454/69 |
| 5,682,757 | * 11/1997 | Peterson | 62/259.2 |
| 5,740,018 | * 4/1998 | Rumbut, Jr. | 361/720 |
| 5,823,005 | * 10/1998 | Alexander et al. | 62/259.2 |
| 5,859,763 | * 1/1999 | Nam et al. | 361/699 |
| 5,907,473 | * 5/1999 | Przilas et al. | 361/699 |
| 5,908,069 | * 9/1999 | Baldwin et al. | 165/41 |
| 5,943,211 | * 8/1999 | Havey et al. | 361/699 |
| 5,953,930 | * 9/1999 | Chu et al. | 62/259.2 |
| 5,966,957 | * 10/1999 | Malhammar et al. | 62/259.2 |
| 6,035,656 | * 3/2000 | Pfister et al. | 62/259.2 |
| 6,092,383 | * 7/2000 | Mertens | 62/238.6 |

\* cited by examiner

*Primary Examiner*—William Doerrler
*Assistant Examiner*—Mark S. Shulman
(74) *Attorney, Agent, or Firm*—Wall Marjama & Bilinski

(57) ABSTRACT

Related components of a refrigeration system are cooled by refrigerant drawn from the system condenser by a pump which serves to raise the pressure of the condensate and move the condensate through the system related component. The condensate is reduced to a vapor as it absorbs parasitic heat losses in the components and is returned to the condenser where the parasitic heat losses are carried out of the system by the condenser coolant so that the system performance is not adversely effected.

16 Claims, 2 Drawing Sheets

SYSTEM FOR REMOVING PARASITIC LOSSES IN A REFRIGERATION UNIT

BACKGROUND OF THE INVENTION

This invention relates to a refrigeration cycle and, in particular, to a system for reducing or removing parasitic losses in a refrigeration system where refrigerant being cycled through the system is used to cool various related component parts of the system.

Heretofore, refrigerant used in refrigeration systems has been utilized to provide cooling to the system's compressor motor or to the oil used to lubricate the compressor motor. Recently, as disclosed in copending application Ser. No. 09/268,573 filed in the name of the present inventors and the disclosure of which is herein incorporated by reference, apparatus has been devised wherein refrigerant from a refrigeration system has been utilized to cool the variable frequency drive (VFD) used to control the compressor motor. The VFD contains power electronics in the form of insulated gate bipolar transistors that generate a relatively large amount of heat. Failure to properly cool these electronic components can result in early failure of the motor control system.

In these prior art cooling arrangements, condensed refrigerant is drawn from the system condenser and placed in heat transfer relationship with part or parts requiring cooling to remove parasitic heat losses. The refrigerant is then returned to the system evaporator and mixed with the in process refrigerant. The refrigerant used for cooling the system related components must thus be processed through the evaporator and passed through the compressor prior to being returned to the condenser thereby adversely effecting the performance of the refrigeration system. In the case where more than one system related component is being cooled, the load on the machine due to parasitic losses can be relatively high. Because the parasitic losses remain generally constant regardless of machine operating conditions, the adverse effect of parasitic losses becomes more pronounced when the machine is operating under partial load.

SUMMARY OF THE INVENTION

It is an object of the present invention to improve refrigeration systems and, in particular, to refrigeration systems utilizing the vapor-compression cycle.

It is a further object of the present invention to use refrigerant from a refrigeration machine to cool various machine related components without adversely effecting the machine's performance.

A still further object of the present invention is to remove parasitic losses in a refrigeration system without adversely effecting the performance of the refrigeration system.

Another object of the present invention is to cool a number of system related components in a refrigeration machine without placing an additional load on the system compressor.

These and other objects of the present invention are attained in a refrigeration system wherein the system evaporator is connected to a condenser by means of a compression and a return line containing an expansion device delivers condensed refrigerant from the condenser back to the evaporator to complete the cycle. A portion of the condensate generated in the condenser is passed through a pump to increase the condensate pressure and to subcool the condensate. The pump is arranged to pass the subcooled condensate through one or more system related components to absorb parasitic heat losses thereby cooling the components. During the cooling process, the condensate is vaporized and the vapor so generated is returned to the condenser. In the condenser parasitic heat losses are absorbed by the condenser coolant and carried out of the system having little, if any, effect on the performance of the system.

BRIEF DESCRIPTION OF THE DRAWINGS

For a better understanding of these and other objects of the present invention, reference will be made to the following detailed description of the invention which is to be read in association with the accompanying drawings wherein.

DESCRIPTION OF THE INVENTION

Figure 1:
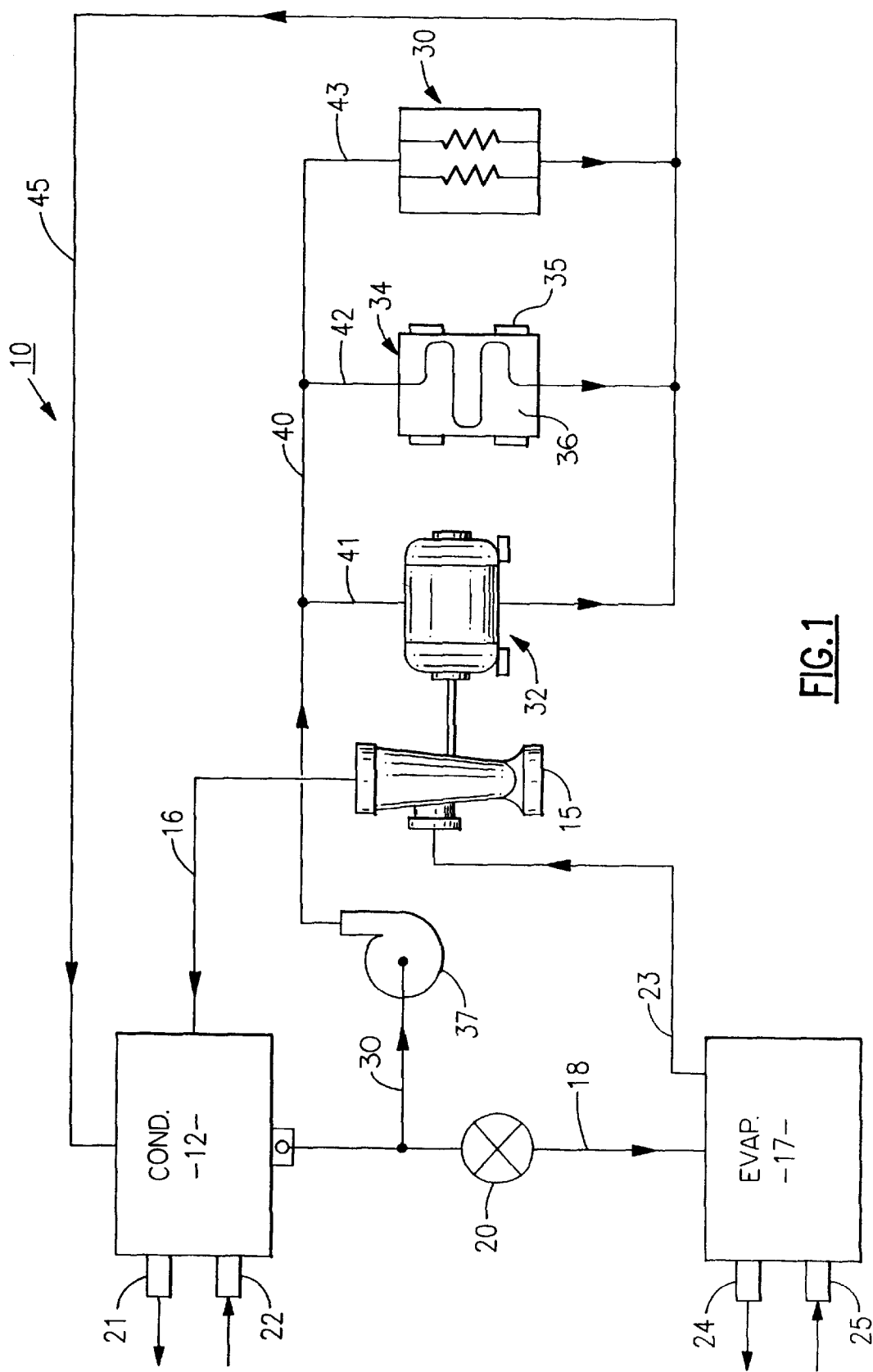
FIG. 1 is a schematic representation illustrating a refrigeration system embodying the teachings of the present invention.

Turning initially to FIG. 1 there is illustrated a refrigeration system generally designated 10 that embodies the teachings of the present invention. The system includes a condenser 12 that is arranged to receive high pressure refrigerant in a vapor state from a compressor 15 via discharge line 16. The refrigerant is condensed in the condenser unit to a wet mixture and is passed on to an evaporator 17 via return line 18. Typically the refrigerant in the condenser is cooled using cooling water, or the like, which carries away the heat of condensation. The cooling water enters the condenser through the coolant inlet 21 and leaves through the coolant outlet 22. An expansion device, such as an expansion valve 20 is mounted within the return line of the evaporator 17 and serves to throttle the condensate down to a lower pressure and to regulate the flow of refrigerant through the system. Due to the expansion process, the temperature and pressure of the refrigerant is reduced isenthalpically prior to entering the evaporator unit.

In the evaporator, the refrigerant is brought into heat transfer relationship with a substance to be chilled such as water which enters and leaves the evaporator via inlet port 24 and the refrigerant leaves via outlet port 25. The refrigerant at the lower pressure absorbs heat from the substance being cooled and the refrigerant is vaporized. Saturated vapors are drawn from the evaporator via the compressor inlet line 23 and compressed to begin the cycle over again.

Also shown in schematic form in FIG. 1 are three system related components that require cooling when the unit is in operation. These include an oil cooler 30 for removing parasitic heat loses from the compressor transmission oil, a motor 32 for driving the compressor having an internal system for cooling the motor stator windings and a variable frequency drive (VFD) 34 containing power electronics 35 mounted upon a heat sink 36 as further described in detail in copending application Ser. No. 09/268,573 filed in the name of the present inventor and which is hereby incorporated herein by reference.

A pump 37 is connected into the return line 18 that extends between the condenser and the expansion valve 20 by means of the inlet line 30 so that a portion of the condensate leaving the condenser is raised to a higher pressure by the pump thus subcooling the refrigerant. The subcooled condensate is discharged from a pump via supply line 40 and distributed to the motor 32, the VFD 34 and the oil cooler 30 via feeder lines 41–43. The supply line is arranged to connect each of the system related components on the discharge sides of the pump in a parallel flow relationship. It should be evident, however, that the supply line can be arranged to pass the pump discharge through the components in a series flow relationship without departing from the teachings of the present invention. The refrigerant, as it passes through each component removes the parasitic heat losses from each component whereupon the subcooled refrigerant is reduced to a saturated vapor. The saturated vapor is returned via vapor line 45 to the condenser where it is mixed with refrigerant from the compressor 15. A variable flow pump may be employed that can be regulated to adjust the cool characteristics of the system.

In the condenser, the refrigerant is brought into heat transfer relationship with the condenser coolant so that the parasitic heat losses are absorbed and carried out of the system by the coolant. Although the coolant has been described above as water, it should be evident that any suitable coolant known and used in the art can be similarly employed without departing from the teachings of the invention.

Figure 3:
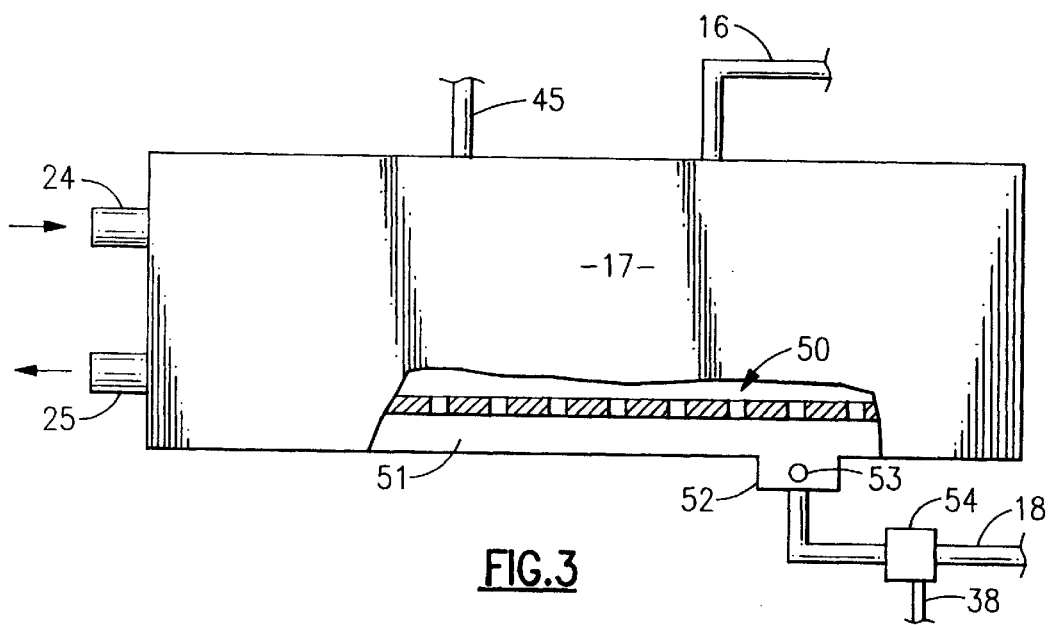
FIG. 3 is a schematic view of the condenser employed in the present system illustrating the flash subcooler utilized therein.

Turning now to FIG. 3, there is presented an enlarged side elevation of the condenser 17 with a lower portion broken away to show a flash subcooler 50 that is mounted within the condenser. The sub-cooler includes a baffle plate 46 that extends across the bottom part of the unit. The baffle plate contains a series of holes 47 through which the refrigerant is throttled into an underlying chamber 51. The flash subcooler chamber 51 is thus maintained at a lower pressure than the main body of the condenser whereby a portion of the condensate is flashed in the condenser vessel thereby cooling the remaining condensate. The liquid drains into a float valve chamber 52 containing a float 53 that forms a liquid seal to keep the flash subcooler chamber 51 isolated from the line 48. A diffuser 54 is positioned downstream from the float chamber for developing a desired static head pressure in the pump inlet line which may be required when the refrigerant in the line is near saturation. Under these conditions, the vapor entering the pump can produce cavitation. When liquid refrigerant passes through the expansion valve 20, some of the refrigerant again flashes to a vapor on the evaporator side of the valve thereby cooling the remaining liquid.

Figure 2:
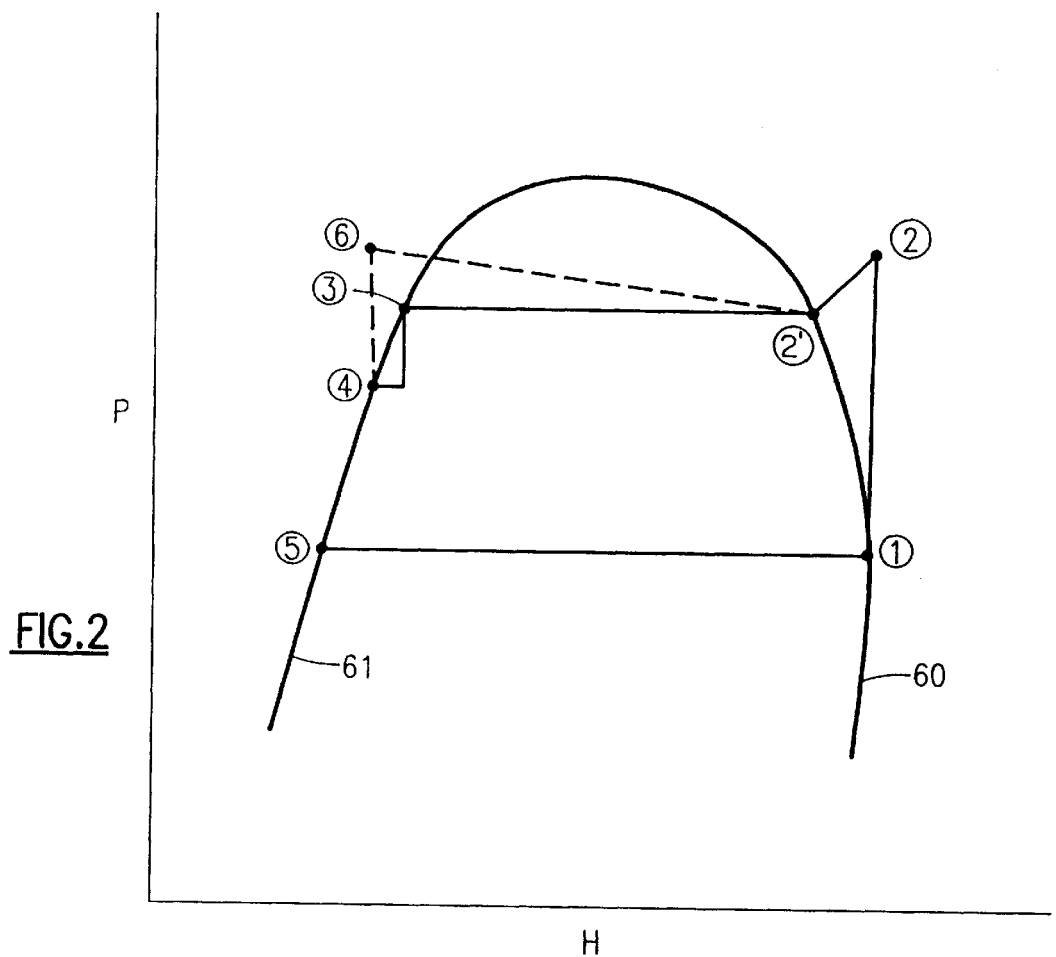
FIG. 2 is a diagram in which refrigerant pressure is related to enthalpy to illustrate the state of the refrigerant as it moves through the system.

The present vapor compression cycle will now be described with reference to the p-h diagram illustrated at FIG. 2. Starting at state point 1 vaporous refrigerant enters the compressor from the evaporator at a low temperature and pressure. After compression the refrigerant leaves the compressor in a super heated state at a state point 2. The vapors enter the condenser and the latent heat of evaporation is removed by cooling water in the main part of the condenser bringing the refrigerant to state point 3. As noted above, the condenser is equipped with a flash subcooler whereby the refrigerant in the condenser is flashed to state point 4. The refrigerant leaving the condenser is then isenthalpically expanded to a lower pressure and enters the evaporator at state point 5. In the evaporator the refrigerant absorbs heat from the medium being cooled and enters the compressor at state point 1.

As noted above, a portion of the condensate leaving the condenser at state point 4 is diverted to the condensate pump and raised by the pump to a higher pressure at state point 6. Alternatively, the condensate can be diverted to the condensate pump at state point 3. As the now subcooled condensate is passed through the components to be cooled, it absorbs the energy from the parasitic heat loses and is returned as a saturated vapor to state point 2' which is located upon saturation line 60.

The energy diagram for the present cycle shows that the energy or heat carried away by the condenser cooling water is:

$$Q_3 = Q_1 + Q_2 + W \qquad (1)$$

wherein:
 $Q_1$ is the heat absorbed by the refrigerant in the evaporator
 $Q_2$ is the parasitic heat loss in the motor, the oil cooler and the VFD, and
 W is the work of the compressor.

As can be seen, by use of a condensate pump to raise the pressure of the refrigerant condensate to a level greater than that leaving the condenser, the condensate is placed in a state that it can absorb heat from various system related components and returned to the condenser in a saturated state where the heat acquired by the refrigerant can be carried away by the coolant. The parasitic heat losses are thus removed in such a way that it does not adversely effect the system performance nor does it require the compressor to provide additional work. The estimated benefit of the present system over a similar system wherein the parasitic loses are absorbed in the evaporator is about 1.5% when the machine operating at full load capacity and about 2.0% when the machine operating at part load capacity as set forth in ARI Standard 550.

While this invention has been explained with reference to the structure disclosed herein, it is not confined to the details set forth and this invention is intended to cover any modifications and changes as may come within the scope of the following claims:

What is claimed is:

1. A method of cooling components of an air conditioning system wherein the outlet of an evaporator is connected to the inlet of a condenser by a compressor and the outlet of the condenser is connected to the inlet of the evaporator by a refrigerant line containing an expansion device, said method including the steps of:

drawing condensed refrigerant generated in the system condenser by a pump means so that the pressure of the refrigerant condensate is raised to a higher level, passing the higher pressure refrigerant condensate discharged from said pump through at least one system related component requiring cooling so that said refrigerant absorbs parasitic heat losses from said component and said condensate is at least partially vaporized, returning the refrigerant vapor generated in said system related component back to the entrance of said condenser, and transferring the parasitic heat losses absorbed by said returned refrigerant into a coolant used to cool said condenser whereby said parasitic heat losses are removed from the system.

2. The method of claim 1 wherein said refrigerant drawn from the condenser is passed in heat transfer relationship with the electronic components of a variable frequency drive that controls the system's compressor motor.

3. The method of claim 1 wherein said refrigerant drawn from said condenser is passed in heat transfer relationship with a system oil cooler.

4. The method of claim 1 wherein said refrigerant drawn from said condenser is passed in heat transfer relationship with the system's compressor motor.

5. The method of claim 1 wherein said refrigerant drawn from said condenser is passed in a parallel flow relationship with the system compressor motor, oil cooler and variable frequency drive for controlling said compressor motor.

6. The method of claim 1 wherein said pump raises the pressure of said condensed refrigerant to a level such that said refrigerant is subcooled.

7. The method of claim 1 that includes the further step of passing condensate generated in the condenser through a flash subcooler prior to delivering said condensate to said pump.

8. Apparatus for removing parasitic losses from components of an air conditioning system having an evaporator that is connected to a condenser by a compressor and wherein the condensate generated in the condenser is returned by a return line to the evaporator through an expansion device mounted in said return line, said apparatus further including:

a pump means having an inlet line connected to the condenser outlet for raising a portion of the refrigerant condensate generated in the condenser to a higher pressure, first flow means connected to said pump means for passing the refrigerant discharged from said pump in heat transfer relation with at least one system related component to be cooled so that parasitic heat losses in said component are absorbed by said refrigerant whereby the refrigerant is at least partially vaporized;

second flow means for returning the vaporized refrigerant from said at least one system related component to the condenser entrance after the refrigerant has absorbed said parasitic heat losses, and cooling means associated with said condenser for absorbing the parasitic heat losses in the refrigerant and carrying the parasitic heat losses out of the system.

9. The apparatus of claim 8 wherein said first flow means is arranged to connect the discharge side of said pump means to a plurality of system related components and said second flow means returns refrigerant from each of said system related components to said condenser entrance.

10. The apparatus of claim 9 wherein said plurality of system related components include a compressor motor, an oil cooler for the compressor transmission and a variable frequency drive for controlling the compressor motor.

11. The apparatus of claim 10 wherein said system related components are connected in a parallel flow relationship by said first flow means.

12. The apparatus of claim 10 wherein said system related components are connected in series flow relationship by said first flow means.

13. The apparatus of claim 8 wherein said condenser includes a flash subcooler for flashing a part of refrigerant within said condenser.

14. The apparatus of claim 8 wherein said inlet line of said pump means is connected into the return line upstream from the expansion device.

15. The apparatus of claims 8 that further includes a diffuser means contained in said return line upstream from the expansion device and said inlet line to said pump means is connected to the diffuser means whereby a given static head pressure is developed for said pump means.

16. The apparatus of claim 8 wherein said pump means is a variable flow pump.

* * * * *